INVENTOR.
Ralph S. Zebarth
BY
ATTORNEY.

United States Patent Office 2,981,972
Patented May 2, 1961

2,981,972

POULTRY SHACKLE

Ralph S. Zebarth, Hickman Mills, Mo., assignor, by mesne assignments, to Gordon Johnson Company, Kansas City, Mo., a corporation of Missouri Filed Sept. 30, 1957, Ser. No. 687,211

3 Claims. (Cl. 17—44.1)

This invention relates to improved poultry shackles and has for its primary object a construction permitting the use of an initially straight, single length of wire or rod material bent and formed into shape to attain the desired results while completely eliminating bracing, cross supports and other reinforcing parts heretofore commonly employed and found necessary in this particular field.

It is another important object of the present invention to provide a shackle adapted to receive the legs as well as the necks of the poultry and including serration means for retarding slippage of the legs from within a pair of retaining loops therefor, so disposed as to avoid interference with rapid operations in manual placement of the birds on the shackle for support thereby.

Another important object of the instant invention is the provision of a poultry shackle that permits use of relatively large diameter rigid rod stock by virtue of a special form of neck-receiving loop that is flattened to reduce the width thereof and thereby cause such loop to fit properly between the neck bones in interlocking relationship thereto.

A further important object of the instant invention is to provide a shackle having transverse structure integrally interconnecting a pair of side members of the frame of the shackle in a manner to present both leg-receiving loops and the neck-receiving loop from a single length of rod material as aforesaid.

Still further, it is an important object of this invention to include in the transverse structure above-mentioned, means to present a mouth for reception of the neck as the same is to be inserted in the loop therefor, all without necessity of welding together a plurality of initially separate pieces as has heretofore been the practice in this field.

Figures 1, 2, 3, 4:
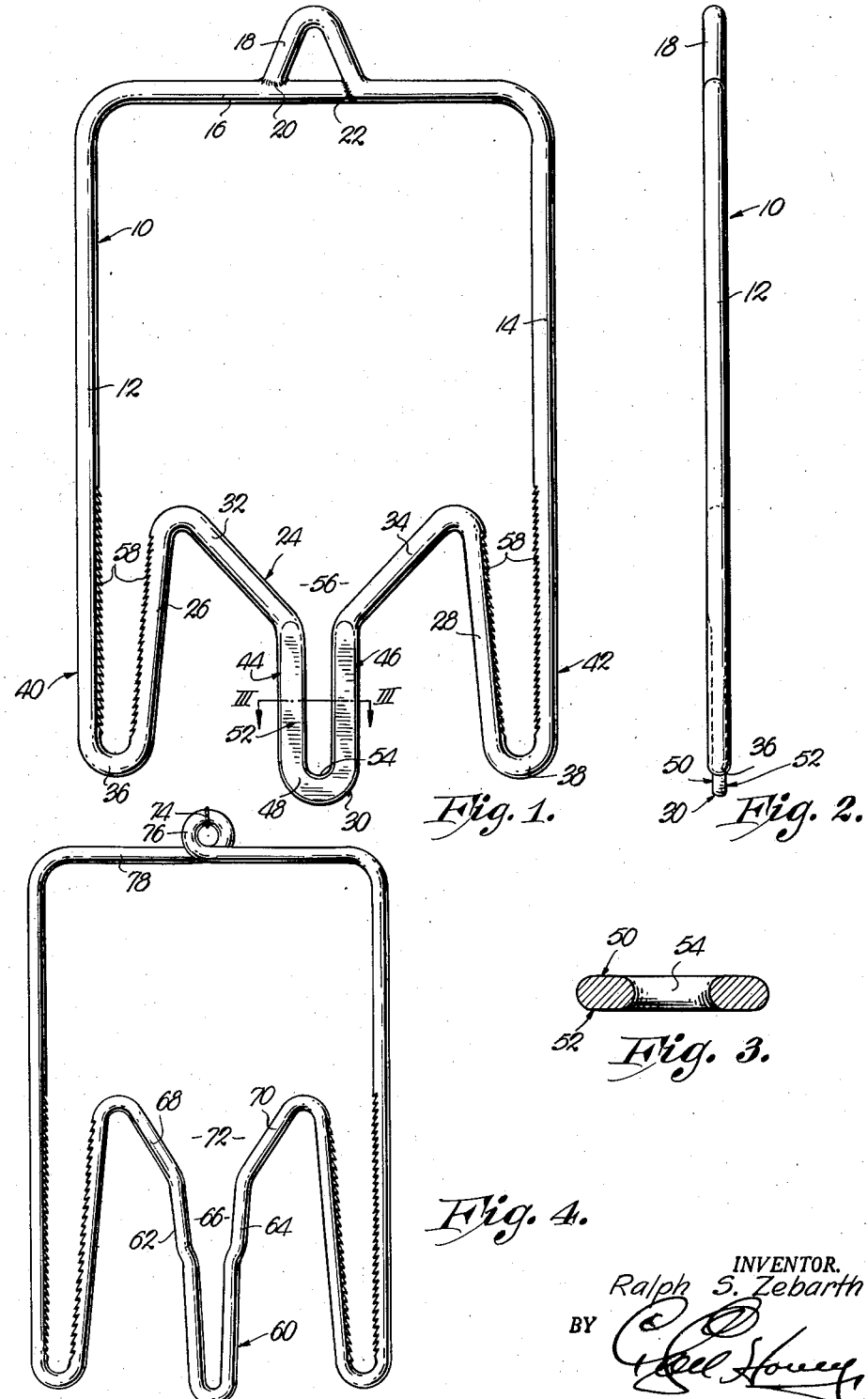
Fig. 1 is an elevational view of a poultry shackle made pursuant to one form of the instant invention.
Fig. 2 is an edge elevational view thereof.
Fig. 3 is an enlarged, transverse, cross-sectional view taken on line III—III of Fig. 1.
Fig. 4 is an elevational view of a modified form of poultry shackle embodying the principles of the instant invention.

The poultry shackle illustrated in Figs. 1 to 3 inclusive of the drawing is made from an initially straight, single length of relatively heavy rod material which is bent and formed to shape, presenting a rectangular frame broadly designated by the numeral 10.

Frame 10 includes a pair of elongated members 12 and 14 presenting sides for the shackle, the sides 12 and 14 being preferably in parallelism. The upper end of the frame 10 is defined by a bridge 16 that integrally interconnects the sides 12 and 14. One terminal end of the rod stock from which the shackle is made is bent to present an eye 18 that is employed to attach the shackle through a chain or the like to trolleys or carriages forming a part of an overhead conveyor not illustrated. Welding as at 20 and 22, closes the frame 10 at the upper end thereof and presents a smooth, uninterrupted construction that is completely sanitary and easily cleaned.

The lowermost ends of the sides 12 and 14 are integrally interconnected therebetween by transverse structure broadly designated by the numeral 24 and which includes a pair of elongated members or fingers 26 and 28, a neck-receiving loop 30 and a pair of elements 32 and 34 integrally interconnecting the loop 30 with the uppermost ends of fingers 26 and 28 respectively.

The fingers 26 and 28 join with the corresponding sides 12 and 24 respectively through arcuate bights 36 and 38 and extend upwardly and inwardly at an angle converging as the uppermost ends of the fingers 26 and 28 are approached. The fingers 26 and 28 and the sides 12 and 14 present therefore, a pair of spaced-apart, substantially U-shaped, leg-receiving loops 40 and 42.

The loops 30, 40 and 42 are all upwardly-facing and the loop 30 is preferably disposed midway between the loops 40 and 42. Loop 30 is of special form and includes a pair of elongated, upstanding members 44 and 46 interconnected by an arcuate bight 48 rendering the loop 30 substantially U-shaped.

It is noted in Fig. 3 of the drawing that the entire loop 30 including both of its members 44 and 46, as well as its bight 48, is transversely polygonal, presenting a pair of opposed flat faces 50 and 52 and an innermost edge 54 that is transversely convex. Thus, the width of the loop 30 between the faces 50 and 52 is appreciably less than the diameter of the remaining parts of the frame 10 and the structure 24 as is apparent in Fig. 2.

The elements 32 and 34 integrally join the uppermost ends of the members 44 and 46 with the uppermost ends of the fingers 26 and 28 respectively and are disposed to present an upwardly-facing entrance mouth 56 for the neck-receiving loop 30. Accordingly, the elements 32 and 34 converge as the loop 30 is approached. All of the parts of the shackle are disposed within a common vertical plane as seen in Fig. 2 of the drawing.

Means is provided on the fingers 26 and 28 and/or the sides 12 and 14 to retard accidental upward movement of the poultry legs and, therefore, slippage thereof from the loops 40 and 42, and taking the form of rows of serrations 58 on the proximal edges of the fingers 26 and 28 and sides 12 and 14. It is to be noted that the serrations 58 preferably extend throughout the lengths of the fingers 26 and 28 and throughout that portion of sides 12 and 14 which cooperate with the fingers 26 and 28 to present the loops 40 and 42. Additionally, it is to be noted that all of the serrations 58 slope downwardly and inwardly to thereby avoid any obstruction to free movement of the poultry legs into loops 40 and 42 while at the same time effectively preventing accidental displacement as aforesaid.

It is now apparent that the construction is such as to permit use of relatively large diameter rod stock and thereby eliminate a maze of cross bracing and the like since the entire structure is inherently strong and will not bend or warp out of shape under normal conditions of use.

The particular nature of the loop 30, as well as the employment of the serrations 58, make it possible to use such heavy rod material and, so far as the loop 30 itself is concerned, the reduced width thereof between faces 50 and 52 permit the loop 30 to interlock between the neck bones of the bird as the latter is attached to the shackle with the legs in loops 40 and 42 and the neck within the loop 30. In this connection it is to be appreciated that the shackle also lends itself to use by suspending the bird only by its legs through use of loops 40 and 42 or solely by its neck through use of loop 30, all as is quite common in the usual eviscerating and poultry-conditioning operations.

The shackle illustrated in Fig. 4 of the drawing has essentially the same characteristics and illustrates the way in which a shackle of the type contemplated by the instant invention, may be made from lighter-gauge material when the same is to be employed in connection with smaller birds. By virtue of such smaller diameter rod stock, neck-receiving loop 60 will properly interlock between the bones of the neck without necessity of flattening, as illustrated in Fig. 3.

The shackle shown in Fig. 4 differs additionally from the one depicted in Figs. 1 to 3 inclusive in that there is provided a pair of extensions 62 and 64 at the upper end of the loop 60 to present a secondary mouth 66 for facilitating the rapid positioning of the neck of the bird into the loop 60. The extensions 62 and 64 integrally interconnect the upper end of the loop 60 with downwardly and inwardly converging elements 68 and 70, the latter of which present entrance mouth 72 comparable with the mouth 56 shown in Fig. 1.

The shackle shown in Fig. 4 differs also at the upper end thereof wherein it is seen that the ends of the rod from which the shackle is made, are connected by a butt weld 74. Eye 76 is formed in bridge 78 as an integral part thereof.

In all other respects the shackle shown in Fig. 4 includes the novel features of the shackle shown in Figs. 1 to 3 inclusive and operates in substantially the same manner when placed in normal use.

Having thus described the invention what is claimed as new and desired to be secured by Letters Patent is:

1. In a shackle for suspending a bird by its neck, a frame of elongated metallic bar material and having an upwardly facing, substantially U-shaped loop including a pair of elongated, substantially parallel, spaced-apart, normally upstanding members and a bight integral with and interconnecting the members at their lowermost ends whereby said loop is adapted to receive the neck of a bird between the members above said bight when the bar is to be suspended from the loop, each of said members having a pair of opposed, flat faces extending throughout substantially the entire length thereof, the faces on one side of the loop being coplanar and the faces on the opposite side of the loop being substantially parallel with the faces on said one side of the loop, the faces on each member being spaced apart a distance substantially less than the normal diameter of said bar material and in sufficiently proximal relationship to permit each of the members to interlock between the bones of the neck of the bird when said neck is positioned in the loop at the upper end thereof and moved downwardly toward said bight.

2. The invention of claim 1 wherein each member has an innermost edge extending between the flat faces of respective members and coextensive in length therewith, said edges being transversely convex and merging arcuately with said faces to present smooth, neck-engaging portions in said loop and thereby eliminating cutting of the skin of the neck when the latter is moved downwardly along the members.

3. The invention of claim 2, wherein the frame is provided with a pair of rod-forming sides therefor, and rod means integrally joining the loop with said sides therebetween, the distance between the faces of each of the members being appreciably less than the diameters of all of said sides and the rod means.

References Cited in the file of this patent
UNITED STATES PATENTS

| | | |
|---|---|---|
| 1,692,365 | Barrier | Nov. 20, 1928 |
| 2,613,390 | Wayne | Oct. 14, 1952 |
| 2,764,778 | Long | Oct. 2, 1956 |
| 2,810,926 | Mitchell et al. | Oct. 29, 1957 |
| 2,850,762 | Goldberg | Sept. 9, 1958 |